US012709110B2

(12) United States Patent
Moriniere et al.

(10) Patent No.: US 12,709,110 B2
(45) Date of Patent: Aug. 18, 2026

(54) PRINTING METHOD FOR PRODUCING A PAINTED SUPPORT

(71) Applicants: Airbus SAS, Blagnac (FR); Airbus Operations SAS, Toulouse (FR); Airbus Operations GmbH, Hamburg (DE)

(72) Inventors: Boris Moriniere, Rochefort (FR); Olivier Bürgy, Toulouse (FR); Samuel Leleu, Toulouse (FR); Fabian Mahler, Hamburg (DE)

(73) Assignees: Airbus SAS, Blagnac (FR); Airbus Operations SAS, Toulouse (FR); Airbus Operations GmbH, Hamburg (DE)

( * ) Notice: Subject to any disclaimer, the term of this patent is extended or adjusted under 35 U.S.C. 154(b) by 125 days.

(21) Appl. No.: 18/926,457

(22) Filed: Oct. 25, 2024

(65) Prior Publication Data

US 2025/0144949 A1 May 8, 2025

(30) Foreign Application Priority Data

Oct. 26, 2023 (FR) ....................................... 2311670

(51) Int. Cl.
*B41J 3/407* (2006.01)
*B41J 29/26* (2006.01)
(Continued)

(52) U.S. Cl.
CPC ............. *B41J 29/26* (2013.01); *B41J 3/4073* (2013.01); *B41M 7/0045* (2013.01); *B41M 7/0081* (2013.01); *G06T 7/0004* (2013.01)

(58) Field of Classification Search
None
See application file for complete search history.

(56) References Cited

U.S. PATENT DOCUMENTS

2008/0152807 A1 6/2008 Baird et al.
2009/0225143 A1* 9/2009 Fukui ................. B41J 11/00214 347/102

(Continued)

FOREIGN PATENT DOCUMENTS

EP 1987889 B1 11/2016
EP 3290166 A1 3/2018

(Continued)

OTHER PUBLICATIONS

French Search Report for corresponding French Patent Application No. 2311670 dated May 17, 2024.

*Primary Examiner* — Scott A Richmond
(74) *Attorney, Agent, or Firm* — Greer, Burns & Crain, Ltd.

(57) ABSTRACT

A printing method comprising application of an ink on a support, pinning of the ink under UV radiation, capture of an image of the decoration and analysis of the image. In the absence of defects, the method continues with deposition of a varnish and solidification under UV radiation. In the event of a defect, the method includes erasure of the ink in a removal zone surrounding the defect, capture of a second image of the removal zone, analysis of the second image so as to determine the part of the decoration to be redone, the repair of the ink by deposition on the support so as to form the part of the decoration to be redone, and looping back to the analysis step.

5 Claims, 1 Drawing Sheet

(51) Int. Cl.

| | |
|---|---|
| ***B41M 7/00*** | (2006.01) |
| ***G06T 7/00*** | (2017.01) |

(56) References Cited

U.S. PATENT DOCUMENTS

| | | | | |
|---|---|---|---|---|
| 2014/0204426 | A1* | 7/2014 | Levi .................. | H04N 1/00031 358/3.26 |
| 2016/0271970 | A1 | 9/2016 | Illsley et al. | |
| 2019/0176482 | A1 | 6/2019 | Kerr et al. | |
| 2023/0127053 | A1* | 4/2023 | Arimura ............ | G03G 15/2098 399/320 |
| 2023/0321687 | A1* | 10/2023 | Arthur .................. | B05D 5/005 427/140 |

FOREIGN PATENT DOCUMENTS

| | | | |
|---|---|---|---|
| WO | 2014165323 | A1 | 10/2014 |
| WO | 2022038491 | A1 | 2/2022 |

* cited by examiner

PRINTING METHOD FOR PRODUCING A PAINTED SUPPORT

CROSS-REFERENCES TO RELATED APPLICATIONS

This application claims the benefit of French Patent Application Number 2311670 filed on Oct. 26, 2023, the entire disclosure of which is incorporated herein by way of reference.

FIELD OF THE INVENTION

The present invention relates to a printing method for producing a painted support, in particular a panel of an aircraft, using an ink which cures when it is exposed to ultraviolet (UV) radiation.

BACKGROUND OF THE INVENTION

In an aircraft, the fuselage comprises a support such as metal or a synthetic material, and it is conventionally covered with paint and/or with ink so as to protect the support and to decorate the aircraft for example with the logos of an airline.

The ink used is generally an ink which is cured by exposure to UV radiation.

The method thus comprises a step of application of an ink that is curable by UV on the support, a step of application of a varnish on the ink and a step of application of the UV so as to cause the ink and the varnish to cure.

Although such a method yields good results, it may happen that the ink migrates before curing, giving rise to defects in the designs and logos.

It is therefore necessary to find a printing method which further improves the finish of the ink applied to the support.

SUMMARY OF THE INVENTION

The subject matter of the present invention is a printing method for printing a decoration on a support, wherein the ink is partially cured and corrected before the varnish is applied and before complete solidification of the assembly.

To this end, there is proposed a printing method for printing a decoration on a support using an ink which cures under ultraviolet radiation, said printing method comprising:

an application step, during which said ink is deposited on the support so as to form the decoration, a pinning step, during which the ink thus applied is subjected to low intensity UV radiation, a first image capture step, during which at least one first image of the decoration is captured, a first analysis step during which the first image of the decoration thus captured is analyzed so as to detect any defects, if no defect is found, the printing method continues with:

a deposition step, during which a varnish is deposited on the ink, and a solidification step, during which the ink and the varnish are subjected to high intensity UV radiation, if a defect is found, the printing method continues with:

an erasure step, during which the ink is removed in a removal zone surrounding the defect, a second image capture step, during which at least one second image of said removal zone is captured, a second analysis step, during which said second image is analyzed so as to determine the part of the decoration to be redone, a repair step, during which said ink is deposited on the support so as to form said part of the decoration to be redone, and a return step, during which the printing method loops back to the first analysis step.

With such a method, the ink forming the decoration is partially cured so as to freeze and correct same before the varnish is applied.

Advantageously, the solidification step is carried out just before the step of deposition of the varnish on the ink.

Advantageously, the application step, the first image capture step and the second image capture step are performed by a machine controlled by a control unit.

Advantageously, the repair step is performed by a machine controlled by a control unit, and said repair step consists of a sub-step of programming of the machine as a function of the part of the decoration to be redone and a sub-step of deposition of ink on the support by the machine thus programmed.

Advantageously, the erasure step is performed by a machine controlled by a control unit.

BRIEF DESCRIPTION OF THE DRAWINGS

The features of the invention mentioned above, and others, will become clearer on reading the following description of an embodiment, said description being set out with reference to the appended drawings, in which.

DETAILED DESCRIPTION OF THE PREFERRED EMBODIMENTS

Figure 1:
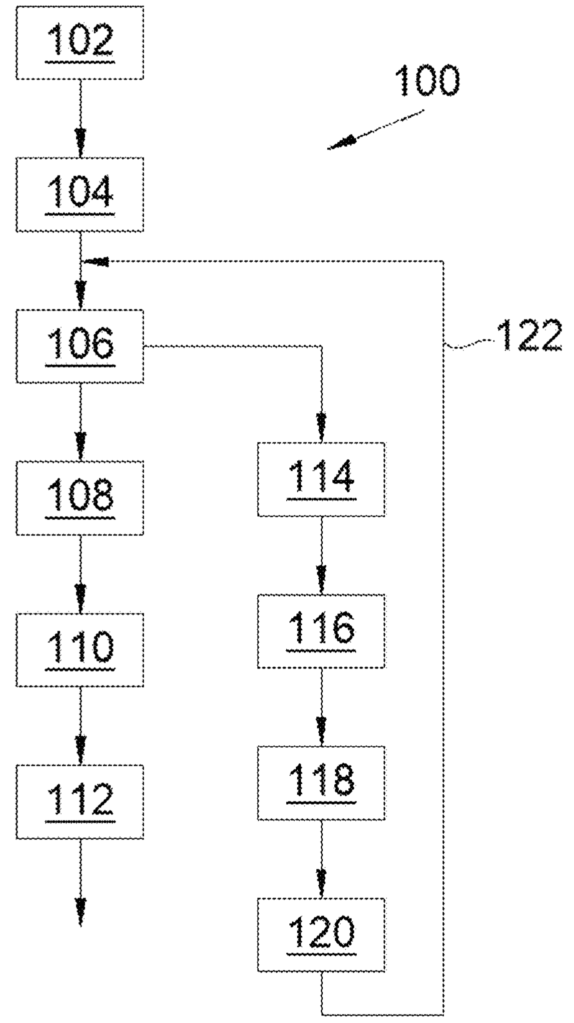
FIG. 1 shows an algorithm of a printing method according to the invention, and FIG. 2 schematically depicts a support painted by means of the method according to the invention.
Figure 2:
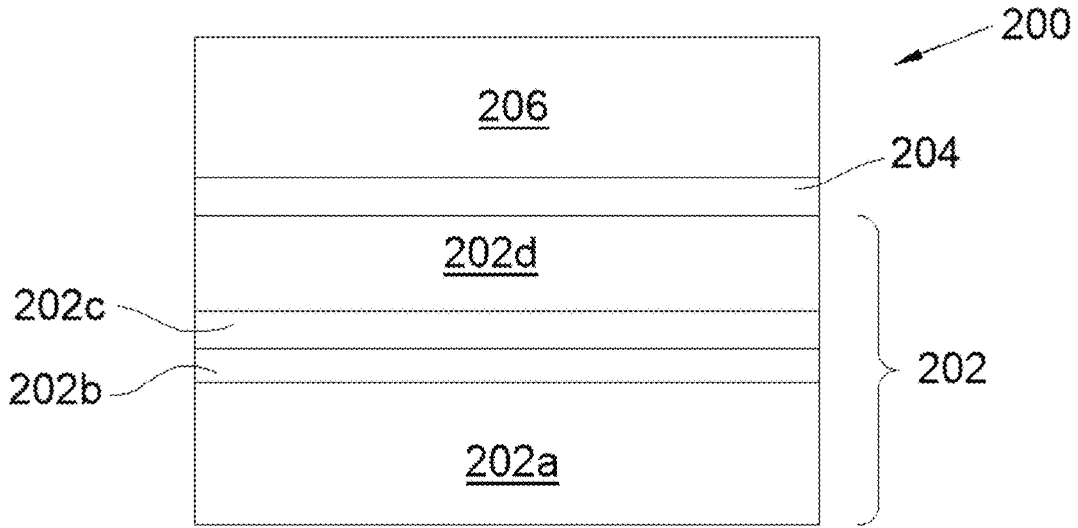

FIG. 1 shows an algorithm of a printing method 100 according to the invention and FIG. 2 shows an assembly 200 comprising a support 202 on which ink 204 and varnish 206 have been deposited by applying the printing method 100 according to the invention.

In the context of the invention, the printing method 100 ensures the printing of a decoration on the support 202. This decoration is for example the logo of an airline when the support 202 constitutes a panel of an aircraft fuselage.

The printing method 100 thus makes it possible to print a decoration on a support 202 using an ink 204, and more particularly an ink which cures when it is subjected to ultraviolet (UV) radiation. In the embodiment of the assembly 200, the ink 204 entirely covers the support 202, but depending on the decoration to be produced, the ink 204 may cover only a part of the support 202.

The printing method 100 according to the invention thus comprises:

an application step 102, during which the ink 204 is deposited on the support 202 so as to form the decoration, and a pinning step 104, during which the ink 204 thus applied is subjected to low intensity UV radiation.

The application step 102 is performed by a printing device comprising a printing head and preferably a machine having at least one driven shaft, at an end of which the printing module is attached. The printing head is for example a printing head of an ink jet printer which simultaneously sprays droplets of ink of different colors using nozzles of the printing head, according to the colors it is desired to obtain. The machine may be any type of machine having at least one shaft that can be controlled in terms of position, such as a robot equipped with an arm.

The pinning step 104 consists in exposing the ink 204 to UV radiation of an intensity sufficient to partially cure the ink 204 but not sufficient to fully cure the ink. The wavelengths of the UV radiation are adapted to the photochemical properties of the ink 204 and the droplets of ink 204 increase in viscosity but do not fully cure. In this state, the droplets of ink 204 are frozen so as to prevent running but remain sensitive and may be erased by contact and/or by chemical attack.

The printing method 100 then continues with a first image capture step 106, during which at least one image of the decoration, referred to as the first image, is captured, using an image capture means such as a scanner or a camera. It is thus possible to take several images with different levels of contrast.

The first image of the decoration thus captured is analyzed during a first analysis step 108. The first analysis step 108 consists for example in processing the first image using image analysis software so as to automatically detect a defect such as drips, areas bare of ink, misalignment of the nozzles of the printing head, a color defect, the presence of dust, etc.

The first analysis step 108 may of course be performed directly by a technician by visual analysis of the first image of the decoration.

If no defect is found during the first analysis step 108, the printing method 100 continues with a deposition step 110 during which a varnish 206 is deposited on the ink 204. This varnish 206 is transparent and adapted to the ink 204 used, and it ensures the protection of the ink 204 for example against impacts.

Once the varnish 206 is in place, the printing method 100 continues with a solidification step 112 during which the ink 204 and the varnish 206 are subjected to high intensity UV radiation which ensures, inter alia, the solidification of the ink 204 through the varnish 206. The intensity of the UV radiation must in this case be higher than that used during the pinning step 104 and it must be sufficient to fully cure the ink 204. As previously, the wavelengths of the UV radiation are adapted to the photochemical properties of the ink 204 and the pinned droplets of ink 204 transition to a solid state.

The curing of the ink 204 is carried out without contact with the oxygen in the air, which inhibits the curing reaction, and the final degree of curing is thus higher than if curing took place in contact with the air.

According to another embodiment of the invention, the solidification step 112 is carried out just before the step 110 of deposition of the varnish 206 on the ink 204, although in this embodiment the curing of the ink 204 then takes place in contact with the oxygen in the air.

If a defect is found during the first analysis step 108, the printing method 100 continues with an erasure step 114 during which the ink 204 is removed in a removal zone surrounding the defect. This erasure step 114 is carried out manually using a solvent suitable for the ink 204 or mechanically, for example using laser blasting. If the defect consists of drips on the edge of the decoration, the removal zone consists of a zone containing the edge and the drips.

The printing method 100 then continues with a second image capture step 116, during which at least one image of said removal zone, referred to as the second image, is captured, using an image capture means such as a scanner or a camera as for the first image capture step 106.

Once the second image has been captured, it is analyzed during a second analysis step 118 so as to determine the part of the decoration to be redone, in order to replace the decoration which was erased in the removal zone. This analysis makes it possible to determine for example the contours to be redone, the colors to be used, etc.

After this analysis, the printing method 100 continues with a repair step 120 during which the ink 204 is deposited on the support 202 so as to form said part of the decoration to be redone.

The printing method then loops back to the first analysis step 108 during a return step 122, in order to continue the analysis of the decoration and validate the printing as it progresses.

With such a printing method 100, the ink 204 forming the decoration is partially cured so as to freeze it in order to allow analysis of the decoration, which may be corrected if necessary before the varnish 206 is applied and before definitive solidification.

Depending on the material of the support 202 and the type of ink 204 used, it may be desirable for the support 202 to include a plate 202*a* made of metal or synthetic material, a base primer layer 202*b* deposited on the plate 202*a*, an outer primer layer 202*c* deposited on the base primer layer 202*b* and a layer of white 202*d* deposited on the outer primer layer 202*c*, and on which the ink 204 is deposited.

Although the printing method 100 may be implemented manually by a technician, as explained above, it is preferable for it to be implemented using a machine equipped with at least one driven shaft bearing the printing head and the image capture means and possibly the mechanical blasting means. The machine, and therefore the printing head, and the image capture means and possibly the mechanical blasting means are controlled by a control unit.

According to a particular embodiment, the application step 102, the first image capture step 106, and the second image capture step 116 are performed by the machine controlled by the control unit wherein the image capture means transfers the images directly to the control unit, which can analyze them. The machine then bears the image capture means.

According to a particular embodiment, the repair step 120 is performed by the machine controlled by the control unit, and the repair step 120 consists of a sub-step of programming of the machine as a function of the part of the decoration to be redone and a sub-step of deposition of ink 204 on the support 202 by the machine thus programmed. The control unit determines, inter alia, the positions that the printing head must take up in order to repair the part of the decoration to be redone, the path that the printing head has to follow, the colors that have to be used and where they must be deposited, etc.

According to a particular embodiment, the erasure step 114 is performed by the machine controlled by the control unit.

According to a particular embodiment, the control unit comprises, connected by a communication bus: a processor or CPU (Central Processing Unit); a RAM (Random Access Memory); a ROM (Read Only Memory), for example a Flash memory; a data storage device, such as an HDD (Hard Disk Drive), or a storage medium reader, such as an SD (Secure Digital) card reader; at least one communication interface COM and/or an I/O (Input/Output) assembly.

The communication interface COM and/or an I/O assembly makes it possible for the control unit to interact with the machine, the printing head, the image capture means, etc.

The processor is capable of executing instructions loaded into the RAM from the ROM, an external memory, a storage medium, such as an SD card, or a communication network. When the control unit is switched on, the processor is able to read instructions in the RAM and execute them. These instructions form a computer program giving rise to implementation, by the processor, of the behaviors, steps and algorithms described herein.

All or some of the behaviors, steps and algorithms described herein may thus be implemented via software by execution of a set of instructions by a programmable machine, such as a DSP (Digital Signal Processor) or a microcontroller, or be implemented via hardware by a machine or a dedicated component (chip) or a dedicated set of components (chipset), such as an FPGA (Field-Programmable Gate Array) or an ASIC (Application-Specific Integrated Circuit). More generally, the control unit constitutes a system in the form of electronic circuitry designed and configured to implement the behaviors, steps and algorithms described herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for printing a decoration on a support using an ink which cures under ultraviolet (UV) radiation, said method comprising:

an application step, during which said ink is deposited on the support so as to form the decoration, a pinning step, during which the ink thus applied is subjected to low intensity UV radiation, a first image capture step, during which at least one first image of the decoration is captured, and, a first analysis step, during which the at least one first image of the decoration thus captured is analyzed so as to detect any defects, wherein when no defect is found, the method further comprising a deposition step, during which a varnish is deposited on the ink, and a solidification step, during which the ink and the varnish are subjected to high intensity UV radiation, and, wherein when a defect is found, the method further comprising an erasure step, during which the ink is removed in a removal zone surrounding the defect, a second image capture step, during which at least one second image of said removal zone is captured, a second analysis step, during which said at least one second image is analyzed so as to determine a part of the decoration to be redone, a repair step, during which said ink is deposited on the support so as to form said part of the decoration to be redone, and, a return step, during which the method repeats the first analysis step.

2. The method according to claim 1, wherein the solidification step is carried out just before the deposition step.

3. The method according to claim 1, wherein the application step, the first image capture step and the second image capture step are performed by a machine controlled by a control unit.

4. The method according to claim 1, wherein the repair step is performed by a machine controlled by a control unit, and wherein said repair step comprises a sub-step of programming of the machine as a function of the part of the decoration to be redone and a sub-step of deposition of ink on the support by the machine thus programmed.

5. The method according to claim 1, wherein the erasure step is performed by a machine controlled by a control unit.

* * * * *